Sept. 27, 1932.       C. D. SMITH       1,880,113
FIELD CONDITIONING MACHINE
Filed April 7, 1930       2 Sheets-Sheet 1
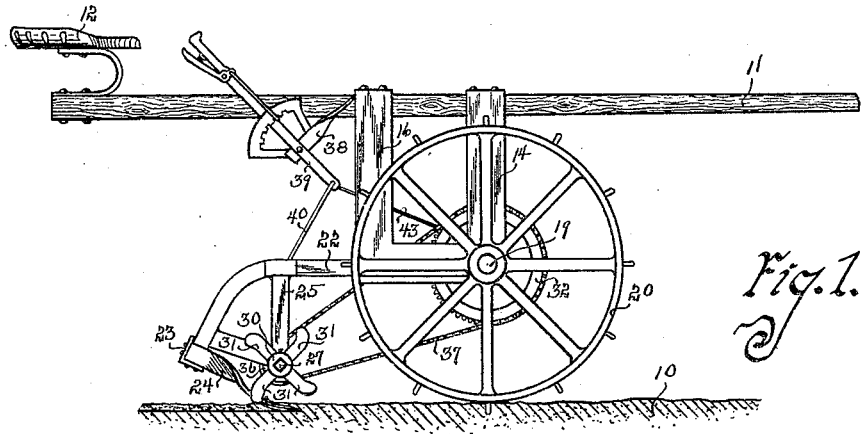
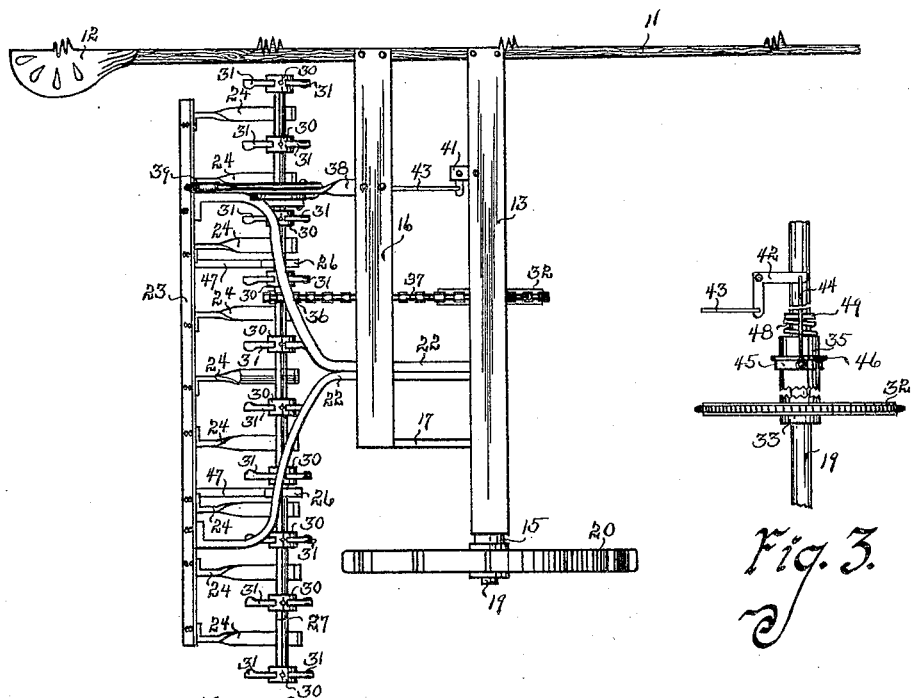
Inventor
Clinton D. Smith
By M. Talbert Dick
Attorney Sept. 27, 1932.   C. D. SMITH   1,880,113
FIELD CONDITIONING MACHINE
Filed April 7, 1930   2 Sheets-Sheet 2

Inventor
Clinton D. Smith
By M. Talbert Dick
Attorney

Patented Sept. 27, 1932

1,880,113

UNITED STATES PATENT OFFICE

CLINTON D. SMITH, OF RUSSELL, IOWA

FIELD CONDITIONING MACHINE

Application filed April 7, 1930. Serial No. 442,201.

The principal object of my invention is to provide a field conditioning machine that will cultivate corn, cotton and the like with great rapidity and without danger of burying or covering the small corn or cotton plants.

A further object of my invention is to provide a device for agricultural purposes that will pulverize the dirt, loam or like over which it is drawn, thereby destroying harmful earth insects and forming a surface mulch.

A still further object of this invention is to provide a device for cultivating corn, cotton and like plants that may be used over damper earth and sooner after a rain than such implements now on the market.

A still further object of my invention is to provide a field conditioning device that does not unduly bank the earth over which it passes regardless of the speed it is drawn.

A still further object of my invention is to provide an agricultural implement for the plowing of such plants as corn, that removes the earth from the roots of undesirable plants which it contacts, thereby destroying such weeds or undesirable plants.

A still further object of my invention is to provide a field conditioning device that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of my complete invention in use.

Fig. 2 is a top plan view of one-half of my invention and more fully illustrates its construction.

Fig. 3 is a top sectional view of the clutch mechanism for operatively connecting the traction wheels of the invention with the pulverizing blades of the invention.

Figure 4:
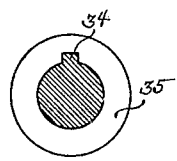
Fig. 4 is an end sectional view of one of the traction wheel axles having a longitudinal key for engaging the clutch sleeve.

One reason for the limited area of corn fields is that it must be regularly cultivated or weeds and unwanted growths will appear and hinder the proper growth of the corn. This process of cultivation with present day equipment is very slow due to the fact that the field cannot be cultivated until the ground is well dried out after a rain and during the cultivating the progress of the cultivator over the ground must be very slow to prevent small plants of corn from being buried by the cultivated earth. For this reason not only is it necessary to farm corn on a small scale, but the inadequate cultivation reduces the yield per acre, tremendously. Another disadvantage is that, as the field cannot be entered until long after a rain, it is impossible to retain valuable moisture in the ground by immediately plowing the ground surface and forming thereby a mulched condition. I have overcome all of these objections by providing a ground conditioning device that pulverizes the top of the soil and destroys weeds and ground insects and their eggs.

I have used the numeral 10 to designate the earth soil in which my implement functions. The tongue of the invention is designated by the numeral 11 having the usual seat 12. Extending transversely from, secured to, and at each side of the tongue is the main frame portion 13. At each outer end of the frame 13 is a downwardly extending arm 14 carrying a bearing member 15.

Also secured to the tongue, spaced apart and extending parallel with the main frame on each side of the tongue is a second portion 16 of the frame, as shown in Fig. 1, and Fig. 2. It should here be noted that the frame portion 16 does not extend as far out as the frame portion 13.

Figure 5:
Fig. 5 is a side view of one of the shovels used for engaging the earth over which the device is drawn.
Figure 6:
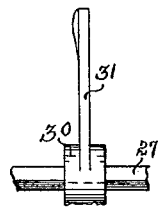
Fig. 6 is a rear view of one of the curved pulverizing blades or arms.
Figure 7:
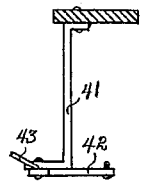
Fig. 7 is a side view of the bracket for supporting the clutch lever.
Figure 8:
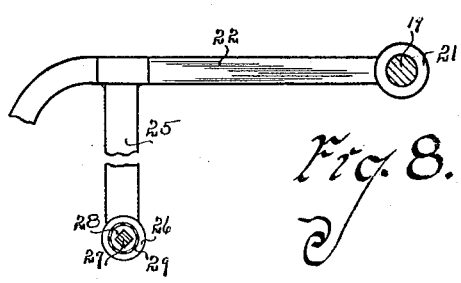
Fig. 8 is a side sectional view of one of the hingedly mounted supporting arms for supporting the shovels and rotatably mounted pulverizing blades.
Figure 9:
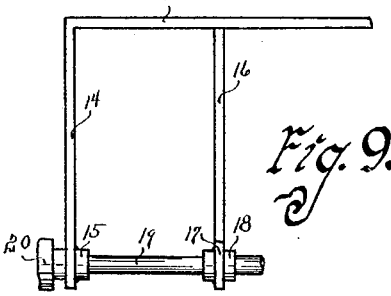
Fig. 9 is a front view of one of the frame members rotatably mounted in which is one of the wheel axles.

Each outer end of the frame 16 is bent downwardly and extending from each end is a forwardly extending arm 17. Each arm carries a bearing member 18 in the same plane as the bearing member 15 on that side of the frame. Rotatably mounted in each pair of bearing members 15 and 18 is a wheel axle or shaft 19. On each axle and secured against relative movement thereto is a traction wheel 20. By this construction when the device is pulled over the ground the wheels 20 will rotate and in turn will rotate the shafts 19. Loosely embracing each shaft 19 is a collar 21. Secured to each collar are two rearwardly extending arms 22. Each pair of arms spread apart and then are bent downwardly at their free ends. Secured by suitable means to the free ends of each pair of arms is a bar 23. Secured by suitable means to each bar 23 are a plurality of spaced apart shovels 24. These shovels are twisted to a near horizontal plane and have their end portions curved forwardly and upwardly as shown in Fig. 5. These shovels have their forward ends sharpened and are designed to engage and cut into the surface of the earth as illustrated in Fig. 1. On each bar the four outer blades at each side of the bar are twisted toward the outer end of the bar 23 so their tendency will be, when engaging the earth to throw it to a position toward the outer ends of the bar 23. The center blade on each bar should be so bent as to have a tendency to throw the soil equally to both sides of itself. The relative twisting of these nine blades secured to each bar 23 is shown in Fig. 2. Extending downwardly from each of the arms 22 is a projection 25 carrying a bearing member 26. In each pair of bearing members 26 is designed to be rotatably mounted a square shaft 27. This is accomplished by having a circular sleeve 28 inside each of the bearing members and embracing the square shaft 27 as shown in Fig. 8.

In order to facilitate the rotation of the sleeves 28, roller bearings 29 may be placed between the inside of each of the bearing members 26 and the outside of the sleeve therein. On each of the square shafts 27 are a plurality of spaced apart hubs 30 secured by suitable means such as set-screws or the like and each carrying a plurality of curved blades 31. It should be here noted that the blades 31 are so placed and are of such dimensions that they cut a path just above and between and on each side of the shovels 24 as shown in Fig. 1, and Fig. 2. By this construction there will be ten hubs carrying pulverizing blades 31 and their curvature will correspond to the curvature of the shovels 24. Loosely mounted on each of the shafts 19 is an enlarged sprocket wheel limited in sliding movement to one direction by a collar 33 rigidly secured on the shaft 19. Slidably mounted on each of the shafts 19 but prevented from rotation by a key arrangement 34 is a sleeve 35 having one of its ends toothed and capable of engaging registering teeth on the hub of the sprocket wheel 32 as shown in Fig. 3. By this arrangement when the sleeve 35 is slid on the shaft 19 until it engages the hub of the sprocket wheel 32, the sprocket wheel 32 will be rigidly secured against relative rotation to the shaft 19, but when the sleeve 35 is pulled away from the sprocket wheel 32, the shaft 19 may rotate independently of the sprocket wheel 32. The numeral 36 designates a comparatively small sprocket wheel secured on each of the square shafts 27.

The numeral 37 designates an endless chain embracing each pair of sprocket wheels 32 and 36. The numeral 38 designates a bracket member secured to each of the frame portions 16. Pivoted to each of these brackets 38 is the usual hand lever 39 capable of being held in the usual manner against undesired movement. The numeral 40 designates a rod extending from each of the hand levers to the arm 22 adjacent to it.

In other words when the hand lever 39 is moved downwardly, the rod 40 attached to it will move upwardly and carry with it the two arms 22 and raise that side of the field conditioning mechanism away from and out of contact with the earth. When it is desired to lower the field conditioning mechanism in contact with the earth, the hand lever 39 is manually moved upwardly and by securing it at various notches in its fastening means various corresponding depths will be reached in the earth by the field conditioning mechanism. In order that the shaft 27 will not be rotated when the shovels 24 are moved out of engagement with the earth, I have provided a mechanism for moving the sleeve 35 away from the sprocket wheel 32 and again into engagement with the sprocket wheel 32 when the shovels 24 are moved to an engaging condition with the earth. This mechanism consists of a bracket 41 secured to each frame 13. Rotatably mounted on each bracket member 41 is an L-member 42 having one end operatively connected to the end of the hand lever 39 adjacent to it by a rod 43, and its other end pivotally secured to a rod 44 which is secured to a fork member 45 riding on the sleeve 35 and between a circular flange 46 and the sprocket wheel 32. The spring 48 embraces each of the axles 19 and has one end engaging a collar 49 and its other end, the end of the sleeve 35 as shown in Fig. 3, for yieldingly holding the sleeve in contact with the sprocket wheel 32. By such a construction the two hand levers completely control my field conditioning machine by pulling the sleeves 35 away from the sprocket wheels 32 and against the spring 48. The numeral 47 designates brace members between the bearings 26 and the bar 23.

When the shovels 24 are lowered into the earth and the device is being moved, the shovels will pick up the upper portion of the soil and due to their curvature will throw the same into the path of the revolving pulverizing blades 31. These pulverizing blades, due to the fact of the difference in the sizes of the sprocket wheels 32 and 36, will be rotating at a high rate of speed and will break and pulverize the solid entering their paths. This pulverizing action of the soil and again evenly distributing it back upon the ground will create a much desired mulch for retaining the moisture in the ground and for the use of the corn or cotton plants. The pulverizing of the soil will also destroy soil insects such as cutworms and the like, and will also beat or remove the soil clinging to the roots of undesirable weeds, thereby leaving such weeds or like on the surface of the ground without the possibility of them living. By the curvature of the shovels and pulverizing blades being slightly curved to prevent the soil that they engage from being thrown over and upon the small corn or cotton plants, there is no danger of burying such corn or cotton plants and, therefore, the field conditioning machine may be drawn through the field at a good speed which is not possible of present day cultivators. Due to the fact that my device can be drawn at high speeds through the field much acreage can be covered in one day, thereby not only making it possible for an agriculturalist to farm a greater acreage of corn or like but making it possible to properly and successfully cultivate corn or like before the latter part of the field is fouled with comparatively large undesirable weeds. It is for this reason that most corn today is checkrowed in order to combat the rapidly growing weeds before all of the field can be cultivated.

When a field is checkrowed the cultivator may attack the large weeds directly in the corn plant row, however, with my device a field may be rapidly cultivated and, therefore, checkrowing is unnecessary and a greater number of corn plants may exist in a single row. By proper cultivation as obtained by my device and greater number of corn plants in an acre of ground, the grain yield will be greatly increased over that which is possible today. Another great advantage of my device over other devices now on the market is that the shovels do not penetrate into the ground very deeply, and, therefore, one may enter the field with my device after a rain long before one could use the present day type cultivator.

My device may be drawn by either horse or motive power.

Some changes may be made in the construction and arrangement of my improved field conditioning machine without departing from the real spirit and purpose of my invention, and it is my intention to cover by my claims any modified forms of structure or use of mechanical equivalents which may be reasonably included within their scope.

I claim:

1. In a device of the class described, a frame, a traction wheel rotatably mounted on said frame, a shaft rotatably mounted on said frame, a means for operatively connecting said shaft to said traction wheel, a plurality of spaced apart hubs on said shaft, a plurality of radially extending pulverizing blades on each of said hubs, and a plurality of forwardly extending curved plows cutting paths directly below said shaft and secured to said frame and in close proximity to the pulverizing blades on each of said hubs respectively; said plows so curved as to move soil in a single direction and into the blades to which they are respectively adjacent.

2. In a device of the class described, a frame, a traction wheel rotatably mounted on said frame, a shaft rotatably mounted on said frame, a means for operatively connecting said shaft to said traction wheel, a plurality of spaced apart hubs on said shaft, a plurality of radially extending pulverizing blades on each of said hubs, a curved portion integrally formed on the outer end portion of each of said blades, and a plurality of forwardly extending curved plows cutting paths directly below said shaft and secured to said frame and in close proximity to the pulverizing blades on each of said hubs respectively; said plows so curved as to move soil in a single direction and into the blades to which they are respectively adjacent.

3. In a device of the class described, a frame, a plurality of wheels for supporting said frame, a shaft rotatably mounted on said frame, a means for operatively connecting said shaft to one of said supporting wheels, a plurality of spaced apart groups of radially extending pulverizing blades on said shaft, a plurality of forwardly extending curved plows cutting paths directly below said shaft, secured to said frame, and in close proximity to the groups of pulverizing blades on said shaft respectively; said plows so curved as to move soil in a single driection and into the group of blades to which they are respectively adjacent, and a curved portion integrally formed on each of said blades extending toward the plow adjacent to it.

CLINTON D. SMITH.